United States Patent [19]
Josten et al.

[11] Patent Number: 5,408,653
[45] Date of Patent: Apr. 18, 1995

[54] EFFICIENT DATA BASE ACCESS USING A SHARED ELECTRONIC STORE IN A MULTI-SYSTEM ENVIRONMENT WITH SHARED DISKS

[75] Inventors: Jeffrey W. Josten, Morgan Hill; Tina L. Masatani; Chandrasekaran Mohan, both of San Jose; Inderpal S. Narang, Saratoga; James Z. Teng, San Jose, all of Calif.

[73] Assignee: International Business Machines Corporation, Armonk, N.Y.

[21] Appl. No.: 869,267

[22] Filed: Apr. 15, 1992

[51] Int. Cl.6 ............................................. G06F 15/40
[52] U.S. Cl. .................... 395/600; 395/425; 364/963.2; 364/974.7; 364/DIG. 2
[58] Field of Search .................... 395/600, 650, 425

[56] References Cited
U.S. PATENT DOCUMENTS

| | | | |
|---|---|---|---|
| 4,399,504 | 8/1983 | Obermarck et al. | 395/650 |
| 4,480,304 | 10/1984 | Carr et al. | 395/725 |
| 4,533,995 | 8/1985 | Christen et al. | 395/250 |
| 4,665,520 | 5/1987 | Storm et al. | 371/7 |
| 4,965,719 | 10/1990 | Shoens et al. | 395/650 |
| 5,043,876 | 8/1991 | Terry | 395/600 |
| 5,247,672 | 9/1993 | Mohan | 395/650 |
| 5,255,387 | 10/1993 | Arnold et al. | 395/600 |
| 5,265,232 | 11/1993 | Gannon et al. | 395/425 |
| 5,276,835 | 1/1994 | Mohan et al. | 395/425 |
| 5,280,611 | 1/1994 | Mohan et al. | 395/600 |
| 5,287,473 | 2/1994 | Mohan et al. | 395/425 |
| 5,287,521 | 2/1994 | Nitta et al. | 395/725 |

OTHER PUBLICATIONS

Research Report—"Aries: A Transaction Recovery Method Supporting Fine-Granularity Locking and Partial Rollbacks Using Write Ahead Logging" C. Mohan, pp. 1–58, Jan. 23, 1989.

Research Report—"Recovery and Coherency Control Protocols for Fast Intersystem Page Transfer and Fine Granularity Locking in a Shared Disk Transaction Environment" C. Mohan & Marang pp. 1–31, Mar. 15, 1991.

Primary Examiner—Thomas G. Black
Assistant Examiner—Paul R. Lintz
Attorney, Agent, or Firm—Baker, Maxham, Jester & Meador

[57] ABSTRACT

A computer-implemented method for minimizing the amount of time to access current data in a database which may be stored wholly in a DASD-oriented external storage subsystem or partly in DASD and partly in a stored high-speed electronic store while maintaining coherency of the data with respect to multiple user systems.

12 Claims, 7 Drawing Sheets

FIG. 6

| Requested Lock Mode | Held Lock Mode | | | | |
|---|---|---|---|---|---|
| | IS | IX | S | SIX | X |
| IS | | | | | no |
| IX | | | no | no | no |
| S | | no | | no | no |
| SIX | | no | no | no | no |
| X | no | no | no | no | no |

FIG. 7

| RSOS | Req. Lock Mode | Cached State | Actual Lock Held | Page-P Locks (updt) | Read from SES | Force at Commit | Reason Lock Mgr Invoke BM Procedure |
|---|---|---|---|---|---|---|---|
| 1 Null | IX,SIX,X | X | X | N | N | N | ISLC |
| 2 Null | IS,S | S | IS,S | na | N | na | RSOS-CH,ISLC (for IS),(for S) |
| 3 IS | IS,S | S | IS,S | na | N | na | RSOS-CH,ISLC (for IS),(for S) |
| 4 S | IS,S | S | IS,S | na | N | na | RSOS-CH,ISLC (for IS),(for S) |
| 5 IS | IX,SIX | SIX | SIX | N | Y | Y | ISLC |
| 6 IX | IX | IX | IX | Y | Y | Y | ISLC |
| 7 IX | IS | IS | IS | na | Y | na | ISLC |
| 8 SIX | IS | IS | IS | na | Y | na | ISLC |

| Cached State | New RSOS | New Cached State | Page-P locks for Updt Bef/Aft | Read from Store Bef/Aft | Force At Commit Bef/Aft | BM processing when downgrading Cached State. Only buffers of DB1 involved |
|---|---|---|---|---|---|---|
| X | X | Null | N/na | N/na | N/na | Write dirty buffers to disk. Synchronize disk I/O's. For New-Cached-State=Null, Purge buffers |
| X | IS | SIX | N/N | N/Y | N/Y | |
| X | IX | IX | N/Y | N/Y | N/Y | |
| X | S | S | N/na | N/N | N/Y | |
| S | X | Null | N/na | N/na | N/na | Purge buffers |
| S | IX | IS | N/na | N/Y | N/na | |
| SIX | X | Null | N/na | Y/na | Y/na | Purge Buffers Convert to Non-Store-Dependent [1] |
| SIX | IX | IX | N/Y | Y/Y | Y/Y | Write changed pages to Store or Acq. P locks on changed pages Convert to Non-Store-Dependent [1] |
| SIX | S | S | N/na | Y/N | Y/na | Convert to Non-Store-Dependent [1] |
| IX | X | Null | Y/na | Y/na | Y/na | Purge Buffers Convert to Non-Store-Dependent [1] |
| IX | S | S | Y/na | Y/N | Y/na | Convert to Non-Store-Dependent [1] |
| IS | X | Null | na/na | Y/na | na/na | Purge buffers |

Note 1: Conversion to Non-Store-Dependent implies write all changed pages of this database to disk and then purge all pages of this database from SES.

FIG. 8

| DBMS1 | GLM | DBMS2 |
|---|---|---|

TX: ACQUIRE LLOCK ON DBI
    REQUEST FIX PAGE

BM: OPEN DB1
    REQ DB PLOCK/IS ⟶ RSOS=NULL
    CACHED STATE=S, ⟵ GRANT IS
    NO FORCE, NON SD
    FIX PAGE

TX: SET WRITE

BM: REQ DB PLOCK/IX ⟶ RSOS=NULL
    CACHED STATE=X, ⟵ GRANT IX
    NO FORCE, NON SD
    REQ DB PLOCK/X ⟶ RSOS=NULL
    MODE=X, CACHED STATE=X, ⟵ GRANT X
    NO FORCE, NON SD

TX: RESET WRITE
    DIRTY PAGE LIST
    •
    •
    •

BM: CLOSE DB1
    PURGE BUFFER
    USING NO FORCE

RELEASE DB PLOCK ⟶ GRANT RELEASE ⟶

*FIG. 9*

EFFICIENT DATA BASE ACCESS USING A SHARED ELECTRONIC STORE IN A MULTI-SYSTEM ENVIRONMENT WITH SHARED DISKS

CROSS REFERENCE TO RELATED APPLICATION

This application is related to U.S. patent application Ser. No. 07/628,211, now U.S. Pat. No. 5,267,835 filed Dec. 14, 1990, entitled "NON-BLOCKING SERIALIZATION FOR CACHING DATA IN A SHARED CACHE", commonly assigned with this application; U.S. patent application Ser. No. 07/627,315, now U.S. Pat. No. 5,287,473 filed Dec. 14, 1990, for "NON-BLOCKING SERIALIZATION FOR REMOVING DATA FROM A SHARED CACHE", commonly assigned with this application; U.S. patent application Ser. No. 07/656,567, filed Feb. 15, 1991, for "FAST INTER-SYSTEM PAGE TRANSFER IN A DATA SHARING ENVIRONMENT WITH RECORD LOCKING", commonly assigned with this application; U.S. patent application Ser. No. 07/790,241, now U.S. Pat. No. 5,301,290, filed Dec. 8, 1991, for "METHOD FOR MANAGING DATABASE RECOVERY FROM FAILURE OF A SHARED STORE IN A SYSTEM INCLUDING A PLURALITY OF TRANSACTION-BASED SYSTEMS OF WRITE-AHEAD LOGGING TYPE", commonly assigned with this application; U.S. patent application Ser. No. 07/493,562, now U.S. Pat. No. 5,301,290, filed Mar. 14, 1990, for "HIERARCHICAL INVALIDATION FOR DISTRIBUTED CACHES", commonly assigned with this application; U.S. patent application Ser. No. 07/512,615, priority date Mar. 13, 1987, for "DYNAMIC SOLE INTEREST IN MULTIPLE SYSTEM LOCKING WITH HIERARCHIES", commonly assigned with this application.

FIELD OF THE INVENTION

This invention relates to methods for managing computer storage in distributed systems. More particularly, the invention concerns a method for minimizing the amount of time to access current data in a database which may be stored wholly in a DASD-oriented external storage subsystem, or partly in the external storage subsystem and partly in a shared high-speed electronic store, while maintaining data coherency with respect to multiple user systems.

DESCRIPTION OF RELATED ART

In a database system wherein a plurality of independently-operating computer systems share data, global locking is employed to maintain coherency of data with respect to the different systems. A. J. Gore, in COMPUTER ARCHITECTURE AND DESIGN, Addison Wesley, 1989, discusses the data coherency problem as one in which sharing data among a proliferation of processors raises the possibility that multiple, inconsistent copies of data may exist because of multiple paths to the data resulting from multiple opportunities to locally modify the data.

The coherency problem has been addressed in the context of a multi-computer, data-sharing system which includes multiple levels of storage. In such a system, a secondary level of storage consists of one or more direct access storage devices (DASD's) which are shared by independently-operating computer systems. Each computer system includes a database management system (DBMS) which provides access to databases stored on the DASD-oriented external storage subsystem. Such a subsystem may be referred to as a "shared disks" (SD) system.

The first two incorporated applications propose an architecture in which inter-system caching is provided in the form of a high-speed, frequently accessed shared electronic store (SES). For various reasons, data is entered into the SES by the database systems after acquisition from DASD's and local processing. The SES is used as a store-in cache, where a version of data can be more recent than the version stored on the DASD subsystem.

In this context, each DBMS possesses and maintains, in its own internal storage, a buffer to which data is fetched for access by one or more locally-executing applications. Each DBMS further includes a buffer manager (BM) for allocating buffer space and for controlling references to it. The buffer manager has access to tables, lists, and other structures containing information about the buffer.

Assuming that a database includes hierarchically-ordered data structures of different granularity, it can be appreciated that these data structures can be locally cached in the buffer of a DBMS. The buffer manager coordinates the movement of these structures between its buffer and external storage via the SES and/or DASD.

A DBMS obtains data and places it in its local buffer in response to transactional activity generated by applications executing on the DBMS's processor. Such applications generate read and write operations which, in turn, utilize the local buffer for access to the data.

Global locking is employed to serialize access by applications to database contents. In this invention, each DBMS includes a local lock manager (LLM) for controlling access to locally-stored data structures among other resources. Locking is mandated by the need for coherency among data structures in general, and among versions of the same data structure in the multi-DBMS environment where multiple local buffers exist.

An operating system such as MVS used in the IBM System/370 includes a hierarchy of locks for various resources in the system. Locks have a name, a scope, and exclusivity. To support inter-system locking, a global lock manager cooperates with the LLM's to manage the granting of locks. Global locking in a shared disk system is covered in detail in IBM Research Report RJ8017, published Mar. 15, 1991, entitled "RECOVERY AND COHERENCY-CONTROL PROTOCOLS FOR FAST INTERSYSTEM TRANSFER AND FINE-GRANULARITY LOCKING IN A SHARED DISKS TRANSACTION ENVIRONMENT", C. Mohan, et al.

The maintenance and management of global locking, while necessary to support inter-system coherency of data in the above-described environment, has substantial costs in the form of increased transaction pathlength and response time. A significant challenge is, therefore, posed in the multi-system environment: to maintain coherency of data among the plurality of systems, while reducing transaction pathlength and response time.

SUMMARY OF THE INVENTION

The principal objective of this invention is, therefore, to maintain coherency of data in a multi-DBMS environment with shared access to DASD-based external storage and shared access to a high-speed electronic cache, while reducing the overheads of global locking.

The objective is achieved in this invention as a result of the inventors' critical observation that local knowledge on the part of a DBMS buffer manager of "intersystem interest" (another system's intention to read or update) in a database can be exploited to efficiently manage the movement of data between the local buffer and external storage by selecting a buffer management policy which best accommodates the level of interest. Relatedly, the DBMS also exploits the level of intersystem interest on the parent resource (that is, the database) to possibly avoid lock calls to a global lock manager for the child resources (for example, records or pages). Therefore, awareness of the level of intersystem interest in a database on the part of buffer manager can significantly reduce the overhead of coherency of pages of that database in a multi-system environment. For example, if, in the face of no intersystem interest in a database, a DBMS follows a "no-force-at-commit" policy, it can write database updates to DASD asynchronously to transaction commit processing. This improves transaction response time and reduces the lock hold time for better concurrency. If, on the other hand, a buffer manager detects intersystem interest in a database, it, according to the invention, follows a "force-at-commit" policy for maintaining coherency. Relatedly, "force-at-commit" requires a DBMS, before releasing locks on pages which are updated by a transaction, to ensure that they are written to storage and that other systems are notified of the changed pages before the updating transaction releases locks upon commitment. In the invention, in order to compensate for the overhead of DASD I/O activities and transaction commit processing, the updated pages are written to SES, whose fast read/write capability shortens the transaction commitment processing and decreases the system response time to transactions.

The invention exploits the knowledge of intersystem interest on a database by allowing a DBMS to selectively follow the no-force policy when it is the only system using the database or all systems using the database are only reading it, or the force policy when one system is updating the database and other systems are reading it or multiple systems are updating the database.

The invention further permits the level of intersystem interest in a database to change at any time and enables all concerned DBMS's to dynamically adjust to such a change.

The method based on these observations involves a multisystem complex including a plurality of database management systems (DBMS's), direct access storage connected to the DBMS's for storage of one or more databases, and a shared store connected to the DBMS's to temporarily store data for rapid access by the plurality of DBMS's. In such a system, the DBMS's provide data from one or more databases to transactions for database processing. The method maintains coherency of a database with respect to the plurality of DBMS's by the following steps:

responsive to a first transaction request to a first DBMS for data from a designated database in the absence of any other transaction requests to any other DBMS for updating data from the designated database:
at the first DBMS, data is obtained from the direct access storage; and a transaction operation is executed and committed on the data at the first DBMS; and
responsive to a second transaction request directed to the first DBMS for data from a designated database which is concurrent with a third transaction request to a second DBMS for updating data in the designated database:
if the data is in the shared store, the data is obtained by the first DBMS from the shared store, otherwise, the data is obtained from the direct access storage;
an updating transaction operation on the data is executed and committed at the second DBMS; and
synchronously with commitment of the transaction operation, the data is placed in the shared store.

Since the updating of data at one system and placement in the shared store may invalidate other versions of the same data at other systems, the other systems are notified of the update either directly by the updating system or by registration of relevant information in the global lock manager which enables another system to detect that it has an invalid copy of the data.

BRIEF DESCRIPTION OF THE DRAWINGS

FIG. 6 is a table illustrating compatability of buffer manager database-P lock modes.

FIG. 7 is a table illustrating determination of the mode of a cached state of a database based on intersystem interest in the database.

FIG. 8 is a table illustrating buffer manager processing and downgrade of the cached state of a database when intersystem interest in the database changes.

FIG. 9 is a flow diagram illustrating the processing steps required to establish, maintain, and change intersystem interest at one DBMS according to the invention.

DETAILED DESCRIPTION OF THE PREFERRED EMBODIMENT

Figure 1:
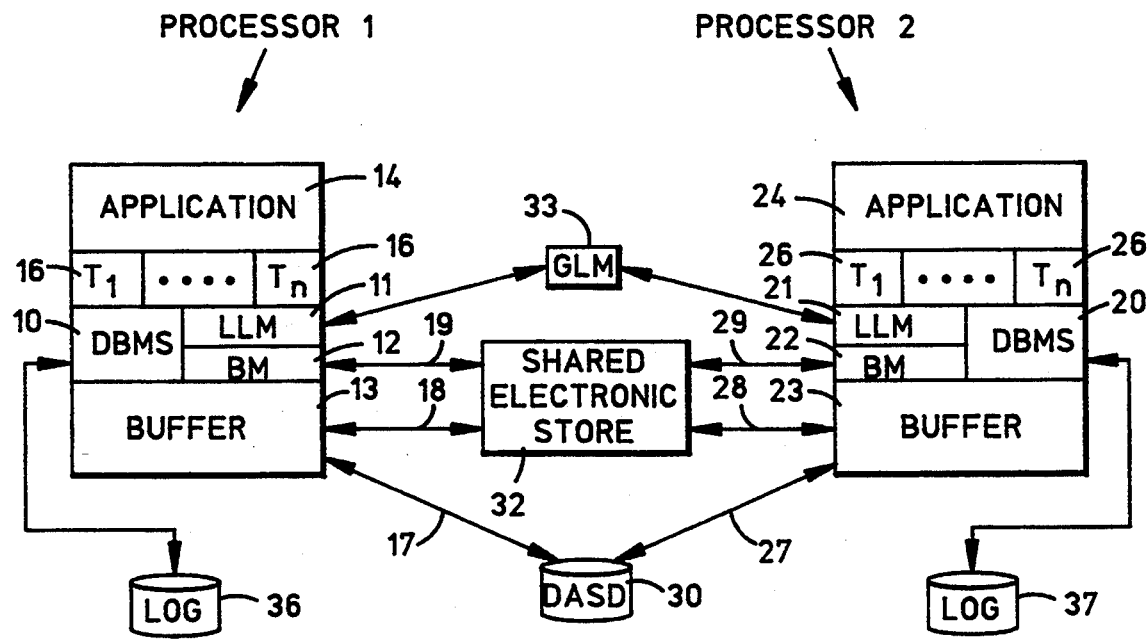
FIG. 1 is a block diagram illustrating the multi-system environment within which the invention operates.

Refer to FIG. 1 for an understanding of the multi-system environment within which the invention operates. In FIG. 1, two CPU's processor 1 and processor 2 are illustrated. Each can comprise, for example, an IBM System/360 or 370 architected CPU having an IBM MVS operating system. An IBM System/360 architected CPU is fully described in Amdahl et al, U.S. Pat. No. 3,400,371, issued on Sep. 3, 1968. Configuration involving CPU's sharing access to external storage is set forth in the incorporated patent applications and in Luiz et al, U.S. Pat. No. 4,207,609, issued Jun. 10, 1980.

Each CPU executes a database management system (DBMS) 10, 20. A DBMS includes a local lock manager (LLM) 11, 21 and a buffer manager (BM) 12, 22. Each BM maintains a local buffer 13, 23 for storage of data. Each DBMS serves one or more applications 14, 24, responding to the requirements of application-generated transactions for reading and updating data.

For purposes of this invention, it is asserted that data is available on DASD-based external storage 30 (hereinafter "DASD") in the form of one or more databases, each including a hierarchical structure of pages and records, with each page including one or more records.

FIG. 1 illustrates the relationship of organized storage to each processor. As shown, each CPU accesses both an internal storage in the form of a local buffer and external storage in the form of DASD 30 and a high-speed, store-in cache 32. The cache 32 is referred to hereinafter as a "shared electronic store" or "SES". The DASD 30 is the ultimate repository of databases, with data pages being selectively moved from the DASD 30 to the buffers 13, 23 over data paths 17, 27. The data paths 17, 27 are conventional I/O couplings between CPU operating systems and DASD 30. The SES 32 is provided for store-in caching of pages which have been brought into the buffers 13, 23 for transaction processing. The SES 32 is written to, and read from, over high-speed links such as fiber optic links 18 and 28 which couple the SES 32 and processors 1 and 2. The SES 32 includes control logic which is invoked by issuing commands, such as Read and Write, by the logic in the BM's over links 19, 29.

The DBMS's 10, 20 also maintain respective logs 36, 37 for recovery purposes in the event of failure. Log-based database recovery is a well-understood feature of database systems whose accommodation of the method of the invention is explained later.

Typically, an application invoking the DBMS 10 would reference a page by an address which names the database containing the page and identifies the page. If the page is not available in the buffer 13, it must be obtained either from the DASD 30 or the SES 32.

Coherency of data with respect to the plurality of processors in the system illustrated in FIG. 1 is ensured by global lock management embodied in a global lock manager (GLM) 33 with connections to each LLM 11, 21. It is assumed that the DBMS's 10, 20 support record level concurrency between transactions. This allows intra-system and inter-system concurrency on a record within a page. However, the unit of coherency between systems is a page. This is because the local buffer manager deals with a page as a unit of I/O. In the explanation that follows, it is assumed that the GLM is an autonomous component which can be executed in its own CPU, or in a co-processing mode in the CPU of one of the DBMS's. Further, it is assumed that the LLM's and GLM communicate by well-known message passing or mail drop techniques.

INTERSYSTEM INTEREST

The invention avoids or reduces the overheads of coherency based on the knowledge of level of intersystem interest on a database. For the purpose of this description, the level of inter-system interest on a database, in increasing order can be:

(a) level A interest in which only one system is using the database, or all systems using the database are only reading it;

(b) level B interest in which one system is updating the database and other systems are reading it; and (c) level C interest wherein multiple systems are updating the database.

In the invention, the buffer manager component of a DBMS is made aware of the level of inter-system interest in a database. Investing the BM with this awareness avoids or reduces the overheads of coherency of pages of that database in the environment of FIG. 1.

For example, to maintain coherency in a shared disks environment while following a no-force-at-commit policy, a DBMS would acquire global locks including a page-cache lock in Share mode on every page which is locally cached in the buffer pool and a page-cache lock in Update mode to update a page. These global locks are in addition to transaction locks and have message overhead.

To maintain coherency while following a force-at-commit policy in a multi-system environment, a DBMS must ensure that pages are written to disks and other systems are notified of changed pages before releasing page locks. The inventors observe that the overhead of disk I/O procedures in transaction commit processing can be reduced significantly by using the shared electronics store with fast read/write capability. Therefore, updated pages can be forced to this store quickly. However, in spite of the shared electronics store, it is contemplated that a no-force policy is faster, less costly, and more efficient than a force policy. Having knowledge of the inter-system interest in the database allows the DBMS to selectively follow the no-force policy when there is level-A interest in a database and the force policy when there is level-B or level-C interest in that database.

Another optimization occurs from informing a DBMS as to inter-system interest. Previously, in a multi-system environment with shared disks, the provision of subpage concurrency within a page required the DBMS to acquire a page-cache lock to serialize concurrent updates to a page from different systems. However, in level-B interest when only one system is updating the database and others are reading it, there is no need for the updating system to acquire a page-cache lock on the page, since it knows no other system will update it.

In summary, informing the DBMS of the level of inter-system interest in the multi-system environment of FIG. 1 provides several significant and unexpected optimizations. When operating at level A interest, a DBMS can follow a no-force-at-commit policy. Significantly, this means that when only one DBMS is accessing a database and is updating that database, it can follow a no-force-at-commit policy and group I/O operations with DASD for batch processing and without the requirement to synchronize the writing of each update to DASD with commitment of the updating transaction. When a DBMS is operating at level A interest, global page-cache locking is not required. When operating at level B interest, only one system is updating; therefore, that one system is not required to obtain a page-cache lock to serialize concurrent updates to the page.

The invention, therefore, is based upon the provision of inter-system interest information to the DBMS's of a system with shared disks and a shared electronics store and the investment of the systems with the ability to selectively implement no force or force policies in response to changing inter-system interest information and further to implement page-cache locking policies in response to the same information. This is significant because prior art systems declare a static policy for inter-system use of a database. For example, in the prior art, a database is declared for read only or for read/write use by multiple system prior to its use in a declared mode. Change of such policy requires an explicit action by means which are external to the DBMS. In the invention, a DBMS observes and reacts to the change of inter-system interest in a dynamic way that requires no external action and that provides the optimizations enjoyed by reduction of coherency overhead described above.

In the preferred embodiment, the DBMS is informed as to current state and change in inter-system interest by the GLM, using an in-place hierarchical locking scheme for caching pages of a database. In the preferred embodiment, the hierarchy includes a database-P (physical) lock on a database, from which page-P locks on database pages descend. In the invention, the BM exploits this hierarchical locking scheme for adapting to the changes of inter-system interest in a database. In the invention, BM locking on a database is different than transaction locking on objects. The purpose of BM locking is to maintain cache coherency in a multi-system environment and has no meaning in a single system environment. The P locks are system level locks, not transaction level locks. Furthermore, in the invention, BM locks are negotiable in that the LLM is made aware that in the case of contention or other activity with reference to a database-P lock, a BM procedure (a "P lock exit") must be invoked. The negotiability of the database-P lock enables a BM to react dynamically to a change of inter-system interest. Management of the inter-system P locks by the global lock manager is discussed below.

THE INVENTION

Figure 2:
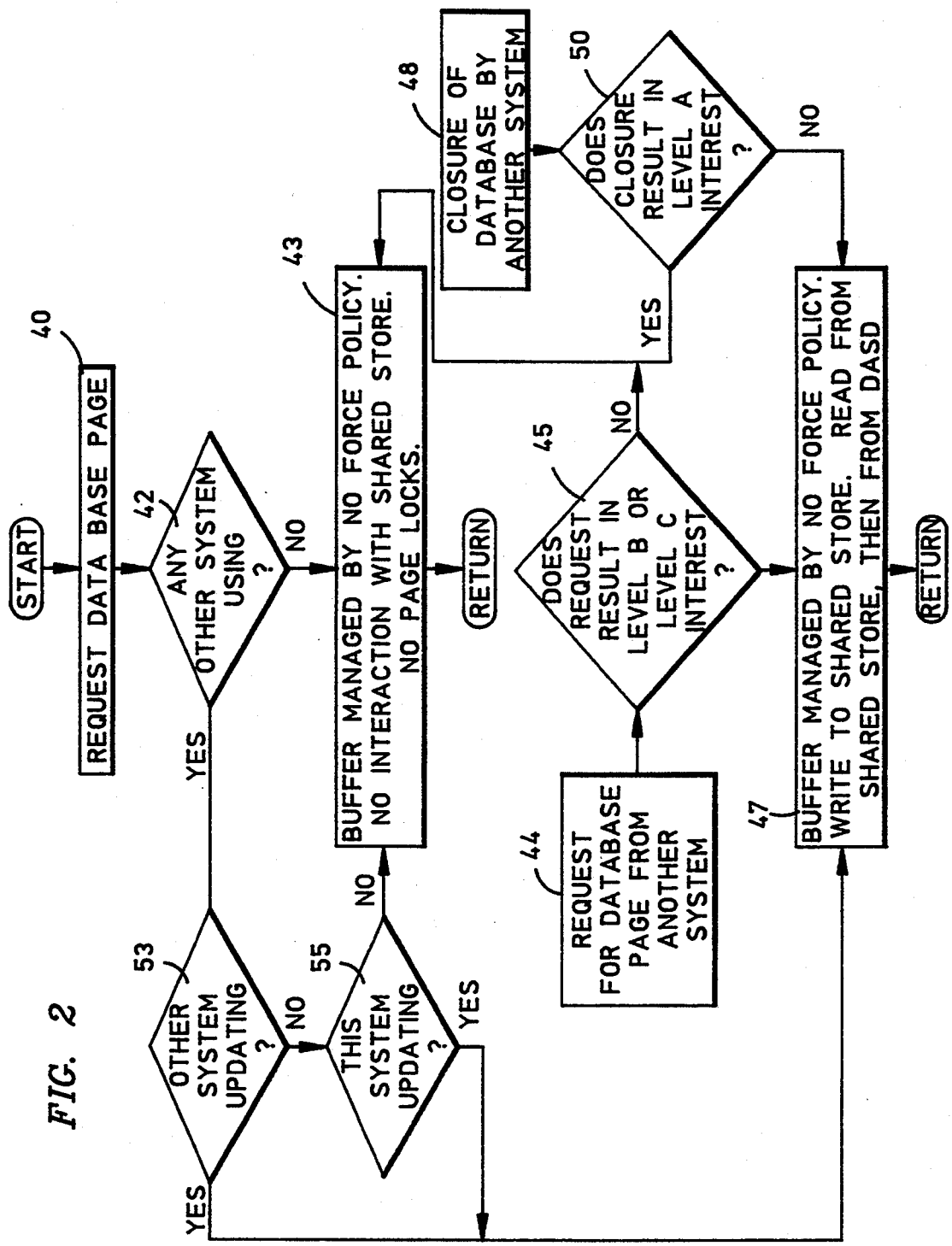
FIG. 2 is a flow diagram illustrating the essential steps in the method of the invention.

FIG. 2 illustrates the essential steps of the invention for a given DBMS. Initially, access will be sought to a database which has not been opened at the DBMS. The request is denoted in step 40. While the database is being opened at this DBMS, BM locking on the requested database will be inspected in step 42 to determine whether another system is currently using the database. If not, the database is acquired, opened, a database-P lock is acquired and tabled at the GLM 33 and the negative exit is taken from decision 42 to step 43. In step 43, in the absence of any other interest in the database, the using DBMS can manage its buffer according to a no-force policy and can dispense with the acquisition of page-P locks for updates to pages in this database. Since the database-P lock is negotiable, any time another system requests (block 44) the database-P lock in a mode which is incompatible with existing held modes, or which causes a change in the resultant mode, the GLM 33 will inform the DBMS. The other DBMS's request is evaluated in step 45. If the request is such that it would result in intersystem read/write (level B) interest or in intersystem write-write (level C) interest, the positive exit is taken from step 45 and the buffers of all DBMS's accessing this database will be managed by a force policy in which pages with committed updates are written to the shared store by the updating system and requests for pages from this database are satisfied by looking first to the shared store and then to the DASD. A necessary step of this force policy is notifying other systems of updates to pages. Such notification can be direct by inter-system message transfer, in which the updating system informs the other systems of the update and the other systems acknowledge the message. The data sharing mode of the IMS products available from the assignee employs this technique by means of a "buffer invalidation message". Alternatively, information signifying page update by one system can be provided to all other systems by means of information maintained at the GLM for this purpose. In this regard, see, for example, the third incorporated U.S. Patent Application in which a version number denoting the latest update of a buffered page is compared against a global lock manager version number for the page which is incremented every time a buffered version of the page is updated. In step 47, if more than one system holds a database-P lock for updating this database, the BM's for all updaters must acquire page locks. Otherwise, if only one system is updating while multiple systems read, the updating system need not acquire page locks. If, at any time that the DBMS is in step 47, the database-P lock is released (block 48) all other systems holding it (level C interest, decision 50) the DBMS can return to the policy optimizations of step 43. Otherwise, the policies of step 47 are maintained.

Returning to step 42, if, upon opening the database, the GLM 33 informs the DBMS that the database is being used (the positive exit from decision 42), the DBMS requesting the database first determines whether a system is updating the database. If so, the positive exit is taken from decision 53 and the DBMS employs the policies of step 47. If the database is being used but not being updated, the DBMS will employ the optimizations of step 43 if it is not opening the database for an update (the negative exit from decision 55); otherwise, the DBMS will follow the policies of step 47. The logic in FIG. 2 also applies when a DBMS gives up the update interest on a database but retains the Read interest.

According to the invention, a BM acquires a database-P lock when the database is opened. This lock is held for at least as long as any page of the database can be cached in the BM's system. The lock name is such that it is different than the database lock acquired by transactions. Similarly, page-P locks acquired by the BM are named differently than page locks acquired by transactions. In connection with P lock grant to a BM, the GLM 33 also provides a data object indicating the resultant state of the lock in other systems (RSOS) as feedback. Importantly, the resultant state is the highest mode of the lock held by any system on the requested database and excluding the mode of the requesting system. The BM uses the RSOS and its requested lock mode of the database-P lock to derive a value for a "cached state" data object which it maintains in DBMS memory. The value of the cached state object is used to determine whether the optimizations described above can be made or not.

Figure 3A:
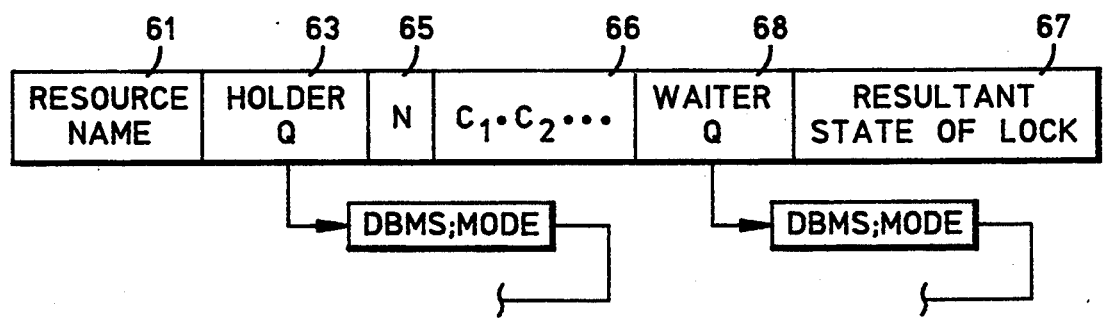
FIGS. 3A and 3B illustrate lock tables maintained in the system of FIG. 1.
Figure 3B:
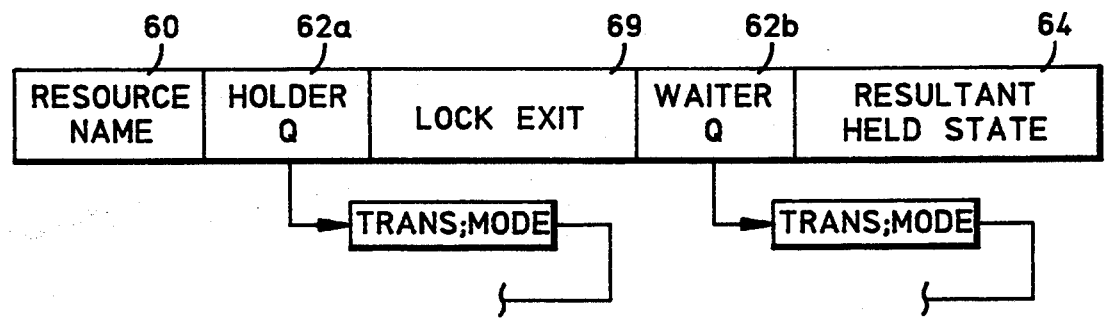
Figure 4:
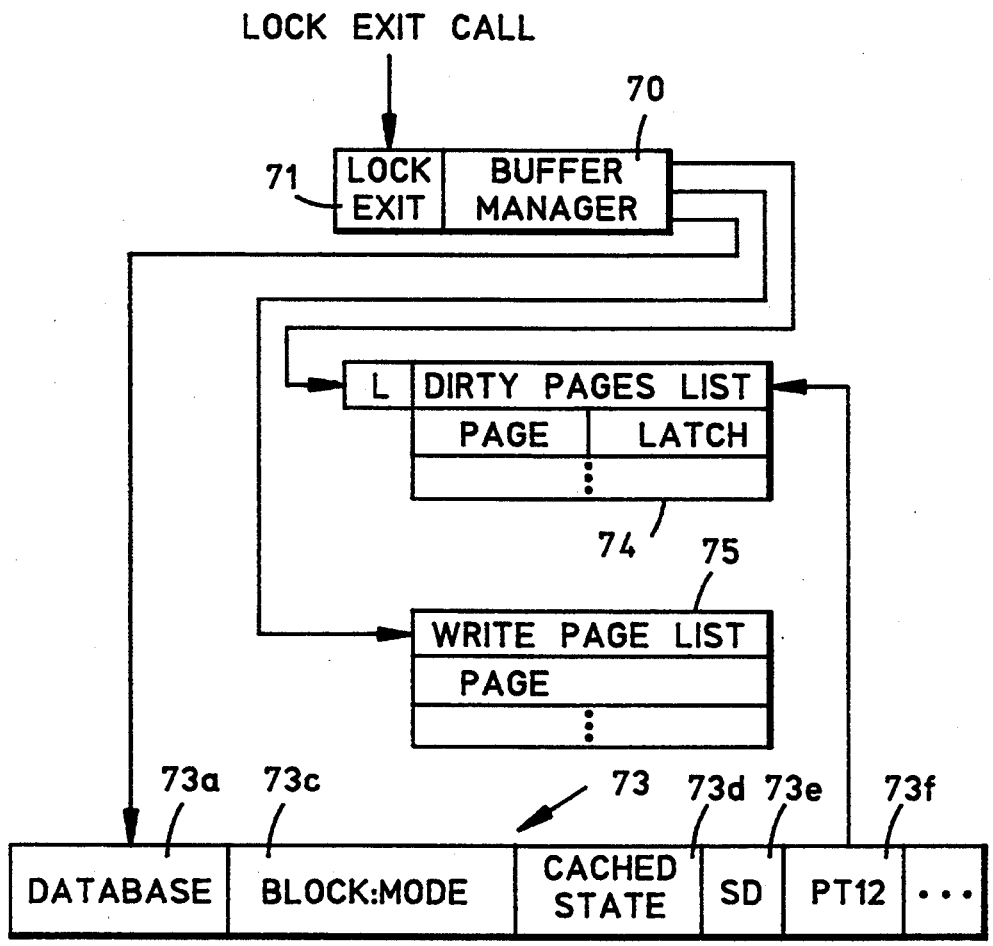
FIG. 4 is a block diagram illustrating the data structures managed by a buffer manager in the practice of the invention.

Refer now to FIGS. 3A, 3B, and 4 which illustrate, respectively, the data structures maintained at the GLM 33, LLM11, and BM 13 for the practice of the invention. FIGS. 3B and 4 are representative of similar data structures at other systems. FIG. 3A illustrates a buffer locking table maintained at the GLM. The entries in the buffer locking table include a field 61 identifying the resource to which the lock applies. The resource could be a database or a page and is implicit in the name of the resource object. The field 63 is the anchor of a queue of DBMS's holding the lock and the lock mode held by each system. Field 65 (N) indicates whether or not the lock is negotiable. Although the invention is based upon negotiability of the BM locks, the inventors contemplate that design considerations relating to priority may deem it necessary in cases to make a BM lock non-negotiable. Field 66 indicates conditions (C₁ and C₂) under which the lock will be negotiated. The field 67 gives the resultant state of the lock, corresponding to the highest mode in which the lock is held. Last, field 68 is anchor for a queue of systems requesting the lock and their requested lock mode.

FIG. 3B illustrates a locking table maintained at LLM 11 of the DBMS 10. Each entry in the LLM lock table includes a field 60 for naming the resource to which a lock applies, a field 62a for anchoring a queue of transactions which hold the lock and the mode in which the transactions hold the lock, a field 69 denoting the P-lock exit routine of the BM 33, a field 62b anchoring a queue of transactions requesting the lock, and a field 64 denoting the resultant held state of the lock on the named resource.

The LLM and GLM lock tables are used in the invention as follows. The LLM/GLM message exchange includes provision for a message from the GLM 33 informing the LLM 11 that the GLM has received from another DBMS a request for a lock on a named resource which either conflicts with a lock held by the DBMS 10 or changes the resultant state of the lock. Thus, upon receiving a lock request from a DBMS, the GLM 33 scans its lock table, determines whether the request results in a change in the resultant state of the lock or conflicts with a mode in which the lock is held and sends a message to the LLM 11 to this effect. If the message indicates lock conflict or change in resultant state of the lock, the LLM 11 calls the lock exit of the BM 13 for action.

In FIG. 4, each buffer manager 70 includes a P lock exit procedure 71 including logic, described below, that enables the BM to negotiate the upgrading or downgrading of a held lock. The call address for this procedure is held in the lock exit field of the LLM's lock table illustrated in FIG. 3B. In the local memory allocated to its DBMS, the buffer manager 70 has access to a database control block 73 for every database which has been opened by its DBMS. Each database control block 73 has an accompanying dirty pages list 74. The buffer manager 70 also maintains a write-page list 75 which is a list of pages to be written to DASD 30 through operating system I/O services. The database control block 73 contains control information, flags, and data structures necessary to implement local maintenance and management of a database and to coordinate that maintenance and management with local control of the same database at other DBMS's. As FIG. 4 illustrates, the database control block includes a field 73a identifying the database, and a field 73c identifying the mode of lock held on the database. A field 73d indicates a "cached state" value relevant to the database. A field 73e contains a store dependency (SD) flag which, if set, indicates that the database is "store-dependent" and, if reset, that the store is "non-store-dependent". Last, a pointer in field 73f locates the dirty pages list 74 for this database in a local memory. The dirty pages list 74 is a conventional listing or sequence of pages held in the local buffers which have been updated and which must be returned to external storage. The list itself is latched by a latch (L) as is each page in the list. The write page list 75 is maintained by the BM 70 to accumulate pages which are to be passed to an external storage management component of the operative system for writing to external storage.

For convenience in describing the method of the invention, the inventors employ lock modes X, SIX, S, IX, and IS in descending order of interest on a database by a DBMS. These modes correspond to lock modes proposed in "Granularity of Locks and Degrees of Consistency in a Shared Database" IBM Research Report RJ 1654, J. Gray, et al, but they have different semantics. In this regard, modes like IX and IS are used in the invention not to denote intention, but to take advantage of compatibility relationships among the lock modes. This incorporates the basis of understanding which has developed for these lock modes and dispenses with the requirement to establish and define new compatibility relationships. The compatibility relationships among the different modes of locking are shown in FIG. 6. A "no" indicates that the corresponding modes are incompatible.

Lock mode X signifies level A interest in which a single system is accessing a database for updating activity. In level B, the single system which is updating the database holds the database-P lock in SIX mode, with the reading systems holding database-P locks in IS mode. IX mode database-P locks are held by systems which are concurrently updating the database, it being understood that those systems acquire X mode locks on the pages which they are updating. The S mode lock signifies that the holding system is reading a database and other systems may be reading it also.

The BM's map lock modes to different levels of system interest, which is implied in their calculation of cached state value. In this regard, a cached state may have a value of X, SIX, S, IX, or IS. A cached state of X implies that only one DBMS has read/write interest in a database, which corresponds to level-A interest. For the system with read/write interest, the RSOS is null, implying that no other system has interest in the database. A cached state of SIX implies that only one system has read/write interest and all other systems have only read interest. These conditions correspond to level-B interest. Using the lock compatibility matrix as shown in FIG. 6, the systems with read interest would have a cache state of IS. For the system with read/write interest, the RSOS is IS; for the reader system, the RSOS is SIX. A cached state of S implies that all systems have only read interest in the database, which implies level A interest. The RSOS for these systems is null, IS, or S. A cached state of IX implies that at least two systems have write interest, and that other systems may have read interest, in a database. This corresponds to level-C interest. The systems with write interest hold the database-P lock in IX mode and systems with read interest (if any) hold the lock in IS mode. The RSOS for all systems in this interest level is IX.

FIG. 7 shows the cached state of all possible requested lock modes and RSOS modes. Thus, the first two columns of FIG. 7 show how the third column—the value of the cached state—is calculated. For example, in line 3 of FIG. 7, assume that a DBMS has requested the database-P lock in IS or in S mode and has received indication that the RSOS has a value of IS indicating that another DBMS is accessing the database for read purposes. In this case, the requesting DBMS will calculate its cached state as S. The fourth column of FIG. 7 shows the actual lock mode which a BM will acquire based on its requested mode and the RSOS. Thus, for example, if a BM requests a database-P lock in IX, SIX, or X mode when the RSOS is null, it will acquire the lock in X mode. The locks held in IX, SIX, or X mode are kept by the GLM 33 across DBMS failure. This is necessary so that in case of a failure of the system, the objects in its buffer which are inconsistent with other versions external to the buffer cannot be accessed by other systems. The fifth column indicates whether the BM must acquire page-P locks based on the cached state. Page-P locks are necessary when the cached state is IX indicating that two or more systems have access to the same database for updating purposes, in which case, all systems will be admitted, but concurrently only to different pages in the database. The sixth column of FIG. 7 indicates whether the SES will be used for reading pages. Thus, in the first four rows of FIG. 7, the DBMS with the actual lock and configuration of column four will not read its pages from the SES. On the other hand, in the last four rows, DBMS will first attempt to obtain a page from the SES and then, if unsuccessful, from the DASD. In the fifth row of FIG. 7, when the cached state is SIX, the updating system must look first to the store for pages. The updated pages could be written to SES by other systems prior to this system becoming the only updater, or this system could have written pages which are not cached locally. The buffer management policy which is followed for updated pages as a result of the cached state is given in column seven. The last column lists the conditions under which a LLM would drive the lock exit procedure of its associated BM for negotiating the lock. In the last column, ISLC refers to intersystem lock contention, while RSOS-CH refers to a change in the RSOS. These are the conditions $C_1$ and $C_2$ which are listed in the GLM's BM lock table (FIG. 3A).

FIG. 8 shows the processing steps in a BM lock exit procedure when the cached state is downgraded. The table illustrates a new cached state calculated based on the current cached state and the new RSOS. This table should be read in conjunction with FIG. 7 with the realization that a change in cache state may change the actual lock held by a DBMS. It should be further be appreciated with reference to FIG. 8 that downgrading of a cached state results in a transition from one lock mode to the next lower one in the mode hierarchy.

The invention also contemplates that the lock exit processing of a BM will upgrade a cached state in the event that a new RSOS less restrictive than the current RSOS is provided by the GLM. This would occur normally in global lock processing for any DBMS holding a BM database-P lock on a database in which another DBMS either downgrades or gives up its database-P lock. Thus, when any DBMS surrenders or downgrades its database-P lock, the GLM calculates a new RSOS for each DBMS. If this new RSOS is less restrictive than the last RSOS communicated to the DBMS holding the database-P lock on the named database, that DBMS is notified in a message containing new RSOS.

To understand how a DBMS upgrades its cached state, refer to FIG. 7 and the following:
1. Interpret the second column as "current cached state" and the third column as "new cached state";
2. Using the new RSOS and the current cached state, find the new cached state; and
3. Compare the new cached state with the current cached state and process page-P locks, SES actions, and the buffer management policy accordingly. For example, if the new cached state is SIX, page-P locks held since such locks are no longer acquired in X mode.

Note when the cached state is upgraded to state X, use of the SES is discontinued since multisystem sharing on the database has ceased. This requires that the changed pages of this database in SES must be written to disk and all pages (of this database) are purged from SES.

EXAMPLE OF LOCK ACQUISITION

Refer now to FIG. 9 for an understanding of how a database is opened at a DBMS and how the DBMS acquires, and changes the mode of, a database P-lock on the database. In FIG. 9, initially, at DBMS 1, a request is received from a transaction ($T_x$) indicating that the transaction has acquired an L lock on a database (DB1). The transaction requests its BM to fix a page of DB1 in its local buffer. In response, the BM of DBMS1 opens DB1 and requests a database P lock in the lowest possible mode necessary to satisfy the fix page request. As FIG. 9 shows, the fix page procedure requires only an IS mode. The request message to the GLM includes identification of the database, the requested lock, the requested lock mode, and the P-lock exit procedure call for the BM. Assuming that no other DBMS is currently accessing DB1, the GLM calculates the RSOS as null, and returns a grant of the requested lock into the requested mode, notifying the BM that RSOS is null. The BM now calculates the cached state value as equivalent to the S mode there being no update intersystem interest in DB1. The SD field in the control block for this DB1 is reset, indicating that pages are to be acquired from DASD and the requested page is fixed in the local buffer by a read operation from DASD.

Assume now that the transaction has acquired an update lock on a record in a page it intends to update. Relatedly, the transaction initiates a BM "set write" procedure which provides notification to BM of the intent to update, and the identity of the page. In order to permit the update procedure to execute, the BM must upgrade the mode of the database-P lock which it holds. In FIG. 9, the BM requests a change call to the lock manager for the database-P lock in IX mode, sending the name of the lock, and the requested mode. Assume, again, that no other system has interest in this database. The GLM calculates the RSOS as null, makes the appropriate entries into its lock table, and returns a grant of the named database-P lock in IX mode, together with the null value of the RSOS. In response to the grant of the IX mode and the null value of the RSOS, the BM calculates its cached state mode as X. In keeping with the upgrading dynamics illustrated in FIG. 7, the BM immediately requests upgrading of the database-P lock to X mode, which is granted in the absence of intersystem interest in the database. Note now that at both the BM and GLM, the database-P lock held by the BM is in X mode, while at the BM, the cached state is X, the SD field is reset, and the BM, in response to the cached state of X, will follow the no-force policy. Following this sequence, BM1 returns to the requesting transaction, permitting the write procedure to continue. When the updating is completed, the updated page is placed in the dirty page list for this database. Assuming that lack of activity or satisfaction of some other criteria has initiated the closure of DB1, the BM will cast out from its buffer all dirty pages for this database using the no-force policy as implied by the cached state of the database. Once the dirty pages have been written to DASD and if there is no further activity in DB1, pages of DB1 are purged from the local cache and the database-P lock is surrendered by issuing a release lock request between BM and the LLM/GLM.

EXAMPLES OF CHANGES OF LOCK MODE

Table I shows a pseudo-code implementation of a method used to downgrade the database-P lock in DBMS1 from X mode to SIX or IX mode. This processing is in the lock exit of the BM in DBMS1. It is asserted that the LLM/GLM lock exit will serialize subsequent lock requests for the database-P lock in that subsequent lock requests directed to GLM will be suspended until the lock exit has completed. The lock exit is triggered by the GLM's message to LLM of DBMS1, because intersystem lock conflict has occurred. The message contains the name of the resource and the new value of the RSOS. Such a conflict can occur when, for example, DBMS2 requests the database-P lock in IS or IX mode to perform a database read or a database update operation. Once the database-P lock is downgraded to SIX/IX, the database becomes store dependent, where updating DBMS's follow the force buffer policy and reading DBMS's first check if a page is in the SES (if the page is not cached locally or the buffer has been invalidated), and acquire the page from DASD if it is not in store.

Part 1 of Table I is a pseudo code illustration of logic in DBMS2 for acquiring the database-P lock in IS mode (for reading the database) or IX mode (for updating the database) while DBMS1 holds the database-P lock in X mode. In Part 1, the lock called "store-dependent conversion lock for DBI" (a different lock than database P lock) is acquired in S mode by DBMS2 if the intent is only to read, and in X mode if the intent is to update the database. The purpose of the store-dependent conversion lock is to serialize the process in DBMS2 which acquires the P lock with DBMS2's P lock exit which might be called by DBMS's request for the database lock before DBMS2 has marked the cached state in its database control block.

In Part 2 of Table I, DBMS1 downgrades the database-P lock from X to SIX mode if DBMS 2 is requesting the lock in IS mode. If DBMS2 is requesting the lock in IX mode, DBMS1 downgrades the lock to IX mode. Implicit in downgrading the database-P lock is the conversion of the database from a non-store-dependent to a store-dependent state. To prepare for downgrading, DBMS1 writes the pages on the dirty page list for the affected database to DASD. To do this, it latches the list in step 151 and then executes the loop comprising steps 152–157 to latch each page in the list and move it to the local write-page list. When all pages have been transferred to the write-page list, step 158 initiates a DASD write I/O process to write the pages. When all pages have been written to DASD, a "database conversion" log record is forced to DBMS1's log before the database-P lock is downgraded. In step 160, the database-P lock is downgraded as required, following which the lock exit procedure releases the latch on the dirty page list, marks all of the written pages as clean and resumes all transactions that require to update the pages.

Figure 10:
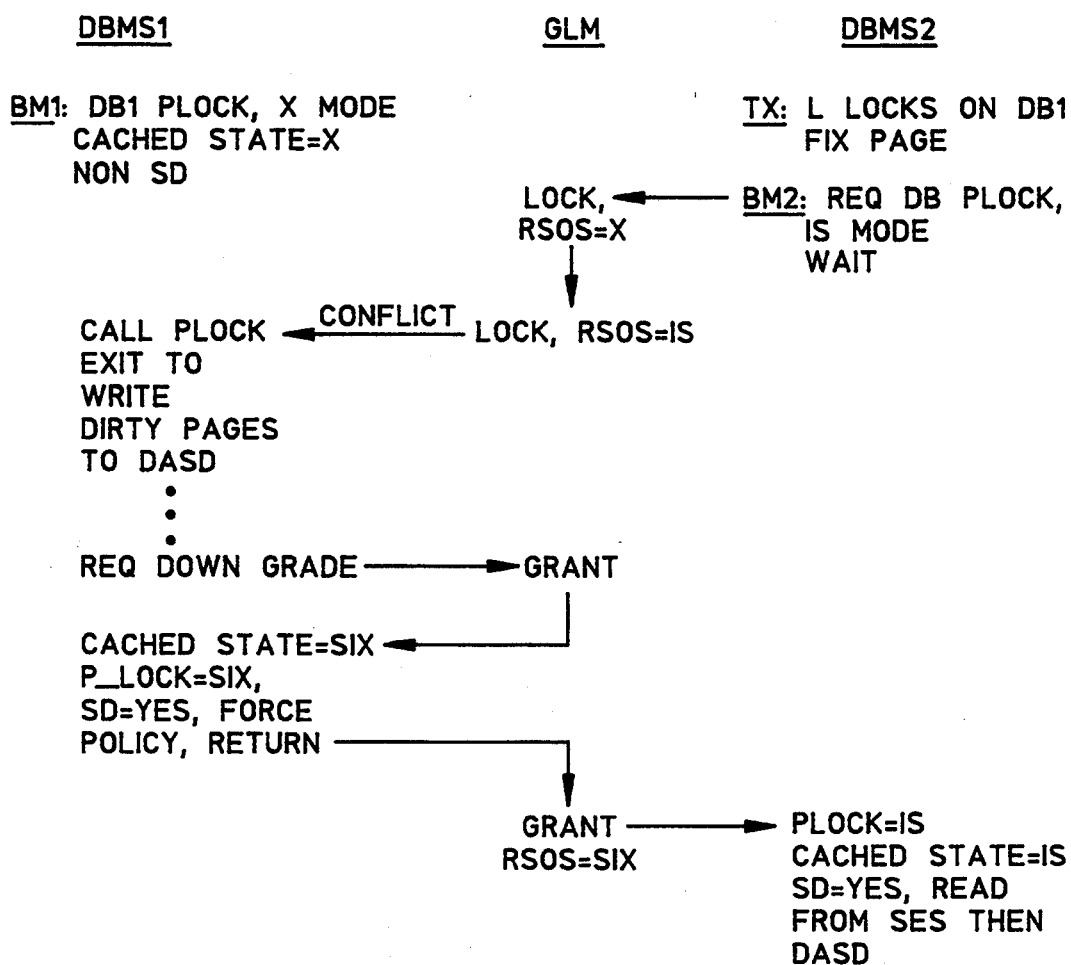
FIG. 10 is flow diagram illustrating the DBMS processing steps which are executed when one DBMS changes the mode of its database lock in response to a change in intersystem interest caused by the request for access to the database by another DBMS.

FIG. 10 illustrates how the database-P lock is downgraded from X mode in the example of Table 1. In FIG. 10, starting initially in the upper left-hand portion, the BM of DBMS1 holds the database-P lock on DB1 in X mode, the cached state for DB1 is X, and it is non-store-dependent. A transaction $T_x$ in DBMS2 acquires an L lock on DB 1 and requests BM2 to fix the page of the database. A request for BM2 is made to the GLM for the DB1-P lock in the IS mode. The GLM inspects its lock table and in response to the request determines that an intersystem lock conflict has occurred and causes LLM to call the P-lock exit of BM1. In response, the P-lock exit of BM1 executes the pseudo code in Part 2 of Table I. Then, the exit requests a downgrade of the P-lock. The request is granted, the cached state and P-lock modes are set to SIX, and the SD flag in the control block for DB1 is set. The P-lock exit returns to LLM/GLM. GLM grants DBMS2's lock request returning a RSOS of SIX. DBMS2 now possesses the P-lock in IS mode, sets its cached state to IS, and sets the SD flag in its DB1 control block.

Table II holds a pseudo code illustration of a method used to release the database-P lock in DBMS1 when the lock is held in S or X mode. In the illustration, this process is triggered by DBMS2's request for the database-P lock in X mode to perform database updates. The inventors contemplate that a DBMS will only request the database-P lock in X mode when a database application has exclusive control of the database, as, for example, when a corresponding database-L lock is already held in X mode by the requesting application. In Table II, DBMS1 is informed to release the database-P lock due to a lock conflict situation. Once the database-P lock is granted to DBMS2 in X mode, the database remains in non-store-dependent mode.

In Part 1 of Table II, DBMS2 acquires the store dependent conversion lock for the database in X mode, acquires the database-P lock in X mode, forces a "database-open" log record to its log data set indicating that the database is non-store-dependent and marks non-store-dependency in the control block in its local buffer together with the P lock and cached state modes. Next, the store-dependent conversion lock for this database is released, permitting other DBMS's to request the P lock.

Part 2 of Table II illustrates how the DBMS1 releases the database-P lock. In Part 2, if DBMS1 holds the database-P lock in X mode, it writes all of the dirty pages for this database in its local buffer to DASD and purges all other buffered pages of the database; if the lock was held in S mode, any pages cached for the affected database are purged from the local buffer; and then the database-P lock is released. Upon releasing the lock, DBMS1 cannot access the database until it reacquires the lock.

Table III is illustrative of downgrading the database-P lock from S to IS mode in DBMS1. The process of Table III is triggered by a request from DBMS2 for the database-P lock in IX mode to perform a database update operation. GLM/LLM reports the lock conflict to the P-lock exit of DBMS1. As the sixth line of FIG. 8 requires, downgrading of the database-P lock from S to IS when RSOS is IX means that the database becomes store-dependent. Table III is also used in the case where DBMS1 holds the database-P lock in IS mode with its cached state being set to S. Under this condition, the P-lock exit of DBMS1 is also informed of a change in RSOS state.

In Part 1 of Table III, DBMS2 acquires the store-dependent conversion lock in X mode from GLM. It then requests the database-P lock in IX mode. When the grant is made (line 302), BM checks the RSOS and upgrades the lock to SIX, and DBMS2 writes a "database open" log record in its log data set indicating that the database is store-dependent and sets the store dependent flag in the control block for the database while entering the cached state mode in the control block. The store-dependent conversion lock is then released and processing continues in DBMS2.

In Part 2 of Table III, when DBMS1 receives notice either of the lock conflict or change in RSOS, it sets the store dependent flag in the database control block, changes the database-P lock state to IS and downgrades its P-lock from S to IS (if necessary).

TRACKING "STORE-DEPENDENCY"

When the SES is used, a BM can realize certain benefits by managing its database-P lock in such a way that the held mode of the lock accurately indicates whether or not the database is "store-dependent". By "store-dependent", the inventors mean to convey the sense of whether a DBMS is using the SES for read and write. The principal reason for tracking store-dependency via the database-P lock is to reduce the time of data unavailability for the database resulting from hard failure of the SES. When such a failure occurs, a DBMS can quickly determine which databases are store-dependent by querying the LLM/GLM as to the modes in which the database-P lock on this database is held. If a lock is held in IX or SIX state by any BM, then the BM has been following the force-at-commit policy and writing updated pages to the SES. In this regard, the database is store-dependent and must be marked as needing recovery. Otherwise, the database is non-store-dependent and is not affected by failure of the SES. This determination process is called "damage assessment". From the standpoint of data availability, damage assessment should be executed quickly to determine whether another SES, if available, should be used and to initiate database recovery.

In order to ensure that the held database-P lock accurately reflects whether the database is store-dependent, a DBMS must take several precautions in downgrading its cached state from X, in converting a database to "non-store-dependent", and in determining store dependency in the face of loss of locks.

A DBMS holding a database-P lock in X mode employs the no-force buffer management policy, reading pages from, and writing pages to, DASD. When it downgrades its cached state from X, it must take two actions before SES can be used for the database. First, the downgrading DBMS must write a "database conversion" log record to its log. Second, during conversion for use of SES, the DBMS must remove the dirty pages of the database from its local buffer by writing them to DASD.

When a database is updated by more than one DBMS, the last updating DBMS must be responsible for converting it from "store-dependent" to "non-store-dependent". A DBMS can determine if it is the last updating system by observing its cached state. In this regard, if its cached state is SIX or X, then the DBMS concludes that it is the last updating system.

Finally, if SES failure occurs and the database-P locks are lost, then a DBMS must use the log records described earlier to determine whether or not the database is "store-dependent". For this purpose, the following log records are applicable:

(a) "database-open" log record: written on the first update with an indicator telling whether or not the database was "store-dependent".

(b) "database checkpoint" log record: written during DBMS checkpoint processing for databases which are recoverable and which have had any updates since being opened. The record includes an indicator to show whether or not the database was "store-dependent".

(c) "database conversion" log record: written by a BM procedure on conversion of a database conversion from "non-store-dependent" to "store-dependent" or vice versa.

(d) "database close" log record: written at database close.

By deriving the information from the log records in time sequence in a system during the restart-recovery processing when locks are lost, it is possible to determine whether the database is store dependent or not. If a database was store dependent, then the database-P lock would be acquired in IX mode by that system. Otherwise, it would be acquired in X mode.

Figure 5:
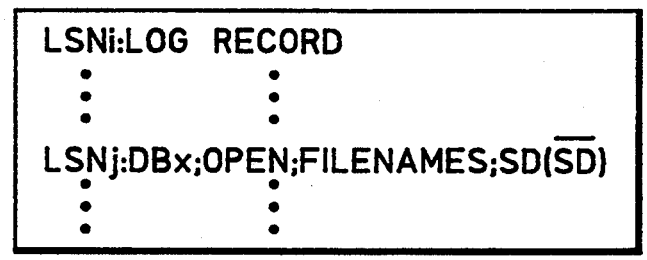
FIG. 5 illustrates a DBMS log with an entry denoting the first update of a database according to the invention.

Logging procedures are assumed in this description to be conventional. A portion of a typical log is shown in FIG. 5 where a log record is shown. Log records are assumed to be in a time-ordered sequence where each record's sequence position is denoted by a log sequence number ("LSN").

EXAMPLES OF STORE-DEPENDENCE CONVERSION AND RECOVERY PROCESSING

Table IV illustrates conversion of a store-dependent database to a non-store-dependent status. This process is triggered by the last updating DBMS when it is ready to close the database, or upgrade the database-P lock cached state to X. In Table IV, the DBMS quiesces all transactions that are updating the database in the entire complex by acquiring the database transaction lock in S mode. Next, it reads all the changed pages for this database from the SES and writes them to DASD. The pages are then purged from the SES and possibly from local buffers, and a "database conversion" log record is written indicating that this database is no longer store dependent. Last, the database-P lock mode is changed to X implying that the database is non-store-dependent or the database-P lock is released. The database transaction lock (the L lock) is released.

Assume that the SES fails. Determination must now be made of databases which need recovery due to the failure, and Table V sets out pseudo code to attach a flag termed "logical recovery pending" to databases affected by SES failure. This flag will signal a recovery process to perform recovery processing on the databases and prevent transactions from gaining access to those databases until recovery is complete. Table V assumes that the database-P locks have not been lost and that the GLM can inform as to which databases were subject to IX and SIX locks; of course, these databases would be store dependent and candidates for recovery.

In the event the locks are lost at the same time the SES fails, each DBMS must use log records to determine whether or not a database is store-dependent. By deriving this information from the log records in time sequence in a the system, it is possible to determine whether a database was store-dependent or not and, therefore, a candidate for recovery.

TABLE I
(Part 1)

101  IF the database-P lock is requested in IS mode THEN

TABLE I-continued

|     |                                                                                                                                                                                                                                                                                                 |          |
| --- | ----------------------------------------------------------------------------------------------------------------------------------------------------------------------------------------------------------------------------------------------------------------------------------------------- | -------- |
|     | /=DBMS2 needs to perform read only<br>/=access to the database                                                                                                                                                                                                                                  | =/<br>=/ |
| 102 | Acquire the database "Store-Dependent" conversion lock in S mode<br>/=This lock is used to serialize<br>/="Store-Dependent" and "Non-Store-<br>/=Dependent" conversion for a database                                                                                                           | =/<br>=/<br>=/ |
| 103 | ELSE  /=DBMS2 needs to update the database                                                                                                                                                                                                                                                       | =/ |
| 104 | Acquire the database "Store-Dependent" conversion lock in X mode<br>/=Acquire lock in X mode to ensure<br>/=that only one member is performing<br>/=the "Store-Dependent" conversion                                                                                                            | =/<br>=/<br>=/ |
| 105 | Acquire the database P-lock in IS/IX mode<br>/=LLM/GLM triggers DBMS1 lock exit<br>/=(due to lock conflict to downgrade<br>/=the database-P lock to SIX/IX<br>/=DBMS2 will not get control until<br>/=DBMS1 has downgraded the database-P<br>/=lock to SIX (IS lock request) or<br>/=to IX (IX lock request | =/<br>=/<br>=/<br>=/<br>=/<br>=/<br>=/ |
| 106 | IF the database-P lock is requested in IX mode THEN                                                                                                                                                                                                                                              | |
| 107 | Write a "Database Open" log record and force it to the log data set to indicate the database is "Store-Dependent"<br>/=this log record is used by DBMS to<br>/=determine whether or not the<br>/=database was "store-Dependent" when<br>/=database-P locks are lost.                            | =/<br>=/<br>=/<br>=/ |
| 108 | ELSE /=IS lock request, do nothing                                                                                                                                                                                                                                                               | =/ |
| 109 | Mark the database as "Store-Dependent" and record its P-lock Cached state (IS/IX) in the database in-memory structure                                                                                                                                                                            | |
| 110 | Release the database "Store-Dependent" conversion lock                                                                                                                                                                                                                                           | |
|     | (Part 2)                                                                                                                                                                                                                                                                                         | |
| 151 | Acquire the database dirty-page-list latch in X mode<br>/=The latch is used to serialize<br>/=adding/deleting page to/from the<br>/=dirty-page-list                                                                                                                                              | =/<br>=/<br>=/ |
| 152 | DO LOOP for each DIRTY page in the database dirty-page-list<br>/=For each database, DBMS maintains<br>/=a list of dirty pages that have not<br>/=been externalized to disk or SES.                                                                                                               | =/<br>=/<br>=/ |
| 153 | Acquire a page latch in S mode to serialize updates against this dirty page<br>/=The dirty-page-list latch is not<br>/=used to serialize updates against<br>/-pages that were already in the list.<br>/=Page latches are used to serialize<br>/=concurrent reads/updates for pages<br>/=that are cached in the buffer pool. | =/<br>=/<br>=/<br>=/<br>=/<br>=/ |
| 154 | Mark page in write I/O in progress mode<br>/=Once a page is in this state, DBMS<br>/=suspends all subsequent updates<br>/=to this page until the disk write<br>/=I/O is completed                                                                                                                | =/<br>=/<br>=/<br>=/ |
| 155 | Release the page latch<br>/=Once a page is marked in write I/O<br>/=state, page latch is no longer<br>/=required to prevent subsequent<br>/=updates to this page                                                                                                                                 | =/<br>=/<br>=/<br>=/ |
| 156 | Dequeue this page from the dirty-page-list and add it to a local write-page-list<br>/=To improve disk I/O efficiency,<br>/=page writes are batched                                                                                                                                               | =/<br>=/ |
| 157 | END                                                                                                                                                                                                                                                                                              | |
| 158 | Initiate disk write I/O to write all pages in the local write-page-list and wait until all I/Os are completed                                                                                                                                                                                    | |
| 159 | Write a "Database Conversion" log record and force it to the log data set to indicate the database is "Store-Dependent"<br>/=this log record is used by DBMS to<br>/=determine whether or not the<br>/=database was "Store-Dependent" when<br>/=database-P locks are lost                        | =/<br>=/<br>=/<br>=/ |
| 160 | Reflect the new P-lock Cache state and "Store-Dependent" attribute in the database in-memory structure<br>/=Once the database is marked "Store-<br>/=Dependent" with the new P-lock<br>/=Cache state, all subsequent database<br>/=updates are required to observe<br>/="Force-At-Commit" policy as well<br>/=as determining whether to use<br>/=page P-locks to manage page<br>/=coherency | =/<br>=/<br>=/<br>=/<br>=/<br>=/<br>=/<br>=/ |
| 160a| Downgrade the database P lock to SIX/IX mode                                                                                                                                                                                                                                                     | |
| 161 | Release the database dirty-page-list latch<br>/=Updates are now allowed against this<br>/=database except for those pages<br>/=which are still marked in write I/O<br>/-progress state                                                                                                           | =/<br>=/<br>=/<br>=/ |
| 162 | DO LOOP for each page in the local write-page-list                                                                                                                                                                                                                                               | |
| 163 | Reset the page write I/O in progress state and mark the page as a CLEAN page                                                                                                                                                                                                                     | |
| 164 | Resume all transactions that need to update this page<br>/=Once the update transaction is<br>/=resumed, it needs to reexamine<br>/=the page status and add page to<br>/=the dirty-page-list if it is not<br>/=DIRTY                                                                              | =/<br>=/<br>=/<br>=/<br>=/ |
| 165 | END.                                                                                                                                                                                                                                                                                             | |

TABLE II

|     |                                                                                                                                                                                                                                                          |          |
| --- | -------------------------------------------------------------------------------------------------------------------------------------------------------------------------------------------------------------------------------------------------------- | -------- |
|     | (Part 1)                                                                                                                                                                                                                                                 | |
| 201 | Acquire the database "Store-Dependent" conversion lock in X mode<br>/=This lock is used to serialize<br>/="Store-Dependent" and "Non-Store-<br>/=Dependent" conversion for a database                                                                    | =/<br>=/<br>=/ |
| 202 | Acquire the database P-lock in X mode<br>/=LLM/GLM triggers DBMS1 lock exit<br>/=(due to lock conflict) to release<br>/=the database-P lock. DBMS2 will<br>/=wait until DBMS1 has released the<br>/=database-P lock.                                       | =/<br>=/<br>=/<br>=/<br>=/ |
| 203 | Write a "Database Open" log record and force it to the log data set to indicate the database is "Non-Store-Dependent"<br>/=This log record is used by DBMS to<br>/=determine whether or not the<br>/=database was "Store-Dependent" when<br>/=database-P locks are lost. | =/<br>=/<br>=/<br>=/ |
| 204 | Mark the database as "Non-Store-Dependent" and record its P-lock Cached state (X) in the database in-memory structure<br>/=SS will not be used by this database<br>/=and DBMS applies "No-Force-At-Commit"<br>/=policy for updates against this<br>/=database | =/<br>=/<br>=/<br>=/ |

TABLE II-continued

| | |
|---|---|
| 205 | Release the database "Store-Dependent" conversion lock |

(Part 2)

| | |
|---|---|
| 251 | IF the database-P lock was held in X mode THEN<br>/=database was updated by DBMS1 and<br>/=potentially there are changed pages<br>/=still cached in DBMS1 local buffers |
| 252 | DO |
| 253 | DO LOOP for each DIRTY page in the database dirty-page-list<br>/=for each database, DBMS maintains<br>/=a list of dirty pages that have not<br>/=been externalized to disk or SS |
| 254 | Dequeue this page from the dirty-page-list and add it to a local write-page-list<br>/=to improve disk I/O efficiency.<br>/=page writes are batched |
| 255 | END. |
| 156 | Initiate disk write I/O to write all pages in the local write-page-list and wait until all I/O's are completed |
| 257 | END. |
| 258 | ELSE<br>/=P-lock was held in S mode, database<br>/=was not updated by DBMS1 |
| 259 | Scan buffer pool to purge all cached pages that belong to this database<br>/=Once DBMS2 starts updating the<br>/=database, DBMS1 cached pages will<br>/=become down-level |
| 260 | Release the database-P lock<br>/=once the P-lock is released, the<br>/=database cannot be accessed until<br>/=the database-P lock is reacquired |

TABLE III (Part 1)

| | |
|---|---|
| 301 | Acquire the database "Store-Dependent" conversion lock in X mode<br>/=this lock is used to serialize<br>/="Store-Dependent" and "Non-Store-<br>/=Dependent" conversion for a database |
| 302 | Acquire the database P-lock in IX mode<br>/=LLM/GLM triggers DBMS1 lock exit<br>/=(due to lock conflict) to downgrade<br>/=the database-P lock. DBMS2 will<br>/=wait until DBMS1 has downgraded the<br>/=database-P lock to IS mode |
| 302a | If RSOS = NULL change database P lock X |
| 302b | If RSOS = IS change database P lock SIX |
| 303 | Write a "Database Open" log record and force it to the log data set to indicate the database is "Store-Dependent"<br>/=this log record is used by DBMS to<br>/=determine whether or not the<br>/=database was "Store-Dependent" when<br>/=database-P locks are lost |
| 304 | Mark the database as "Store-Dependent" and record its P-lock Cached state (SIX) in the database in-memory structure<br>/=SS will be used by this database<br>/=and DBMS2 applies "Force-At-Commit"<br>/=for updates against this database |
| 305 | Release the database "Store-Dependent" conversion lock |

TABLE III-continued (Part 2)

| | |
|---|---|
| 351 | Mark the database in-memory structure to indicate that the database is now "Store-Dependent" and the database P-lock state is IS,<br>/=with P-lock state held in IS,<br>/=database will continue to stay<br>/=in read only access mode |
| 352 | Downgrade the database P-lock from S to IS |

TABLE IV

| | |
|---|---|
| 401 | Acquire the database-L lock (i.e., transaction lock) in S mode to quiesce and prevent transactions from updating this database |
| 402 | DO LOOP for all the changed pages for this database in the SS |
| 403 | Notify SS to retrieve the page names of the first/next set of changed page for this database<br>/=SS provides a special protocol to<br>/-retrieve the names of all changed<br>/=pages in SS for a database.<br>/=Since the feedback name-area size is<br>/=limited, DBMS might have to invoke<br>/=SS multiple times to retrieve all<br>/=changed pages. |
| 404 | If no more changed pages THEN<br>/=Either SS has no changed pages<br>/=for this database (first call) or<br>/=all changed pages have already<br>/=been castout by this process (next<br>/=call request) |
| 405 | GO TO T2L1<br>/=all changed pages have already been<br>/=castout to disk |
| 406 | DO LOOP all changed page names retrieved from SS |
| 407 | Notify SS to perform Read-For-Castout for page P<br>/=Mark page P in SS as in castout<br>/=pending state and transfer<br>/=data from SS to castout buffer |
| 408 | Write page P to disk from the castout buffer |
| 409 | Notify SS to perform Unlock-Castout-Lock<br>/=Reset castout pending for page P |
| 410 | END. |
| 411 | END. |
| 412 | T2L1: |
| 413 | Notify SS to purge all the pages of this database from the SS<br>/=SS should not cache any pages for<br>/=this database once the database is<br>/=converted to "Non-Store-Dependent" |
| 414 | Write a "Database Conversion" log record to indicate the database is now "Non-Store-Dependent"<br>/=this log record is used by DBMS to<br>/=determine whether or not the<br>/=database was "Store-Dependent" when<br>/=database-P locks are lost |
| 415 | IF it is ready to close the database THEN<br>/=this process is triggered on behalf<br>/=of a database close request |
| 416 | Close the database by purging pages from the local buffer pool and release the database-P lock |
| 417 | ELSE |

TABLE IV-continued

| | |
|---|---|
| /=it is triggered by the last updating | =/ |
| /=system to upgrade the database-P | =/ |
| /=lock Cached state to X | =/ |

| | |
|---|---|
| 418 | Change the database-P lock mode to X and set the database in-memory structure to indicate that it is "Non-Store-Dependent" and its cache state is "X" |
| 419 | Release the database-L lock |

TABLE V

| | | |
|---|---|---|
| 501 | Query LLM/GLM for all "Store-Dependent" databases that are using the SS at time of failure | |
| | /=DBMS ensures that the database-P | =/ |
| | /=locks are held in SIX/IX mode for | =/ |
| | /=all "Store-Dependent" databases | =/ |
| | /=the database-P lock name also has | =/ |
| | /=identifier which allows DBMS to | =/ |
| | /=query database-P locks that are | =/ |
| | /=associated with a given SS | =/ |
| 502 | Set "Recover Pending" for databases that are "Store-Dependent" | |
| | /=once a database is marked recover | =/ |
| | /=pending, it is unavailable until | =/ |
| | /=it is recovered. Note that it is | =/ |
| | /=a logical data recovery operation | =/ |
| | /=and will only need to apply DBMS | =/ |
| | /=logs against the current disk copy | =/ |
| | /=of the database | =/ |

Obviously, while the invention has been particularly shown and described with reference to the preferred embodiment described above, it will be understood by those skilled in the art that many changes in form and detail may be made therein without departing from the spirit and scope of the invention.

We claim:

1. In a database system including a plurality of database management systems (DBMS's), direct access storage connected to the DBMS's for storage of one or more databases, and a shared store connected to the DBMS's to temporarily store data for rapid access by the plurality of DBMS's, wherein:
said DBMS's provide data from one or more databases to transactions for database processing:
a method for maintaining coherency of a database with respect to said plurality of DBMS's, the method comprising the following steps:
(1) responsive to a request by a first transaction to a first DBMS for data from a designated database, the request being in the absence of any other transaction requests to any other DBMS for updating the designated database:
(1a) at the first DBMS, obtaining the data from the direct access storage without checking for the data in the shared store;
(1b) executing the first transaction by conducting a transaction operation at the first DBMS; and
(1c) committing the first transaction; and following the commitment of the first transaction:
(2) responsive to a request by a second transaction to the first DBMS for data from the designated database, the request being substantially concurrent with a request by a third transaction to a second DBMS for updating the designated database;
(2a) at the first DBMS, if the data requested by the second transaction is in the shared store, obtaining the data from the shared store, otherwise obtaining the data from the direct access storage;
(2b) executing and committing the third transaction at the second DBMS;
(2c) synchronously with the commitment of the third transaction, writing data updated by the third transaction from the second DBMS to the shared store.

2. The method of claim 1, wherein in step (2) the request by the second transaction is a request for updating data in the designated database, step (2a) including:
(2ai) first, exclusively locking a data object in the designated database to be updated by the second transaction for the first DBMS;
(2aii) next, if the data object is in the shared store, obtaining the data object from the shared store, otherwise obtaining the data object from the direct access storage;
(2aiii) further, executing and committing the second transaction on the data object at the first DBMS;
(2aiiii) synchronously with commitment of the second transaction at the first DBMS, writing the data object to the shared store; and
(2av) then, unlocking the data object.

3. The method of claim 1, step (1b) further including:
(1bi) executing an updating operation on the data at the first DBMS; and
(1cl) asynchronously with the commitment of the first transaction, writing the data to the direct access storage.

4. The method of claim 1, wherein step 2(c) further includes providing notification of updating the data at the second DBMS to all other DBMS's.

5. In a database system including a plurality of database management systems (DBMS's), direct access storage connected to the DBMS's for storage of one or more databases, a shared store connected to the DBMS's to temporarily store data for rapid access by the plurality of DBMS's, and a locking mechanism for granting access to a database, a method for maintaining coherency of a database with respect to said plurality of DBMS's, the method comprising the following steps:
granting sole access to a first DBMS for acquiring data from a designated database;
at the first DBMS, during said sole access, obtaining the data from the direct access storage;
executing a transaction operation on the data at the first DBMS;
during said sole access, generating a request for access to the designated database from a second DBMS;
responsive to the request from the second DBMS, writing updated data of the designated database from the first DBMS to the direct access storage and removing all non-updated data of the designated database from the first DBMS; and
changing the sole access of the first DBMS and granting the second DBMS access to the designated database.

6. The method of claim 5, wherein the second granting step includes granting shared access to the second DBMS for updating the designated database, further including:
changing the sole access of the first DBMS to shared access;

at the second DBMS, updating data of the designated database and writing the updated data of the designated database to the shared store; and at the first and second DBMS's, obtaining required data of the designated database from the shared store or from the direct access storage if the required data is not in the shared store.

7. The method of claim 6, further including:

at the second DBMS, surrendering access to the designated database;

changing the access of the first DBMS to sole access;

at the first DBMS, during said sole access, obtaining data from the direct access storage.

8. The method of claim 5, wherein the second granting step includes granting shared access to the database for reading pages in the designated database, further including:

changing the access of the first DBMS to shared access;

at the first DBMS, obtaining pages of the designated database without locking the pages;

updating the pages at the first DBMS and writing the updated pages to the shared store; and at the second DBMS, obtaining pages of the designated database from the shared store or from the direct access storage if the pages are not in the shared store.

9. The method of claim 5, wherein before the step of generating a request from the second database:

the step of obtaining data from the direct access storage includes obtaining pages of the designated database without locking the pages; and the step of executing a transaction includes updating the pages; the method further including:

returning updated pages from the first DBMS to the direct access storage.

10. In a database system including a plurality of database management systems (DBMS's), direct access storage connected to the DBMS's for storage of one or more databases, a shared store connected to the DBMS's to temporarily store data for rapid access by the plurality of DBMS's, a log mechanism for each DBMS in which transaction records are written in a monotonically-increasing sequence, and a locking mechanism for granting access to a database by a locking procedure in which a lock on a designated database is granted to a requesting DBMS, the lock being conditioned to denote:

a first mode in which a single DBMS is updating data resources in the designated database; or a second mode in which two or more DBMS's have been granted access to update data resources in the designated database;

a method for recovery of the designated database in response to failure of the shared store, the method executed while writing transaction records of incremental changes to the designated database to the logs of all DBMS's having access to the designated database, and including the steps of:

(a) at a first DBMS which holds the lock in the first mode, writing updates of the designated database to the direct access storage;

(b) providing notification to the first DBMS of a request by a second DBMS to update the designated database;

(c) at the first DBMS, in response to the notification:
writing a database conversion log record denoting a change of the designated databases from a non-store-dependent state in which updates to the designated database are written to the direct access storage to a store-dependent state in which updates to the designated database are written to the shared store;

writing to the direct access storage all updates of the designated database which have not yet been written to the direct access storage; and downgrading the lock to the second mode;

(d) at the second DBMS, obtaining the lock in the second mode and updating the designated database;

(e) at the first and second DBMS's, writing to the shared store all updates of the designated database;

(f) in the event of a failure of the shared store, inspecting the mode of the lock, and:

marking the designated database as store dependent in response to the second mode of the lock;

recovering the designated database using transaction records in the DBMS's logs; and barring access to the designated database in response to the store dependent marking until recovery is completed.

11. The method of claim 10, wherein in the event of failure of the shared store and the locking mechanism the following steps are performed instead of step (f):

inspecting the logs of all DBMS's for store dependent entries;

in response to the store dependent entry for the designated database, marking the designated database as store dependent;

recovering the designated database using transaction records in the DBMS's logs; and barring access to the designated database during recovery processing in response to the store dependent marking until recovery is completed.

12. The method of claim 10 further including the steps of:

before failure of the shared store;

granting the lock in the second mode to a plurality of DBMS's, updating the designated database and then surrendering the lock at the plurality of DBMS's until a single remaining DBMS holds the lock in the second mode; and at the single remaining DBMS, writing all updates for the designated database which are in the shared store to the direct access storage, purging the updates from the shared store, writing a database conversion log record denoting a change of the designated database from the store dependent to the non-store dependent state, and upgrading the lock to the first mode in which the single remaining DBMS is updating the designated database; and wherein step (f) now includes:

in the event of failure of the shared store, inspecting the mode of the lock and marking the designated database as non-store dependent in response to the first mode of the lock, recovering any databases which are store dependent, and permitting access to the designated database during the recovery process; otherwise, if the lock fails, inspecting the logs of the DBMS's for database conversion log records and, in response to the database conversion log record denoting a change in the designated database from a store-dependent to a non-store dependent state marking the designated database as non-store dependent, recovering all store-dependent databases, and permitting access to the designated database during recovery.

* * * * *